United States Patent [19]

Cogliano et al.

[11] 4,110,143
[45] Aug. 29, 1978

[54] PROCESS FOR MAKING A WETTABLE POLYOLEFIN BATTERY SEPARATOR

[75] Inventors: Joseph A. Cogliano, Baltimore; Nelson S. Marans, Silver Springs, both of Md.

[73] Assignee: W. R. Grace & Co., New York, N.Y.

[21] Appl. No.: 516,224

[22] Filed: Oct. 21, 1974

[51] Int. Cl.$^2$ ............................................. H01M 2/16
[52] U.S. Cl. ..................................... 156/167; 156/181; 427/302; 429/250
[58] Field of Search ............... 156/244, 278, 167, 161, 156/314, 178, 181; 117/47 A; 260/877; 136/146; 427/302; 419/250

[56] References Cited

U.S. PATENT DOCUMENTS

| | | | |
|---|---|---|---|
| 3,020,174 | 2/1962 | Natta et al. | 427/302 |
| 3,330,702 | 7/1967 | Horowitz | 136/146 |
| 3,361,842 | 1/1968 | Applegath et al. | 260/837 |
| 3,458,597 | 7/1969 | Jabloner | 260/877 |
| 3,615,995 | 10/1971 | Buntin et al. | 156/161 |
| 3,656,884 | 4/1972 | Okaya et al. | 260/877 |
| 3,773,590 | 11/1973 | Morgan | 156/244 |

Primary Examiner—Douglas J. Drummond
Assistant Examiner—Michael W. Ball
Attorney, Agent, or Firm—Richard P. Plunkett; William W. McDowell, Jr.

[57] ABSTRACT

This invention is directed to a process for forming a wettable battery separator comprising a non-woven mat of polyolefin fiber by forming a non-woven mat of polyolefin fiber having a thickness in the range 10 to 40 mils and pore sizes less than 40 microns, contacting the mat with an aqueous solution of a water soluble peroxy compound, e.g. hydrogen peroxide or potassium persulfate at a temperature below 70° C, rinsing the mat in water and thereafter immersing the thus treated mat in an aqueous solution of a hydrophilic vinyl monomer such as acrylic, methacrylic, vinyl sulfonic acid, said solution containing a redox catalyst, e.g. an ion of a transition metal, e.g. ferrous, cerous, cobaltous, or an organic amine, thereby causing a graft polymerization of said hydrophilic vinyl monomer on said polyolefin mat to give a wettable polyolefin battery separator.

4 Claims, No Drawings

PROCESS FOR MAKING A WETTABLE POLYOLEFIN BATTERY SEPARATOR

The instant invention is directed to a process for producing a wettable battery separator formed from nonwoven mats of polyolefin fibers and the battery separator resulting therefrom. More particularly the present invention is directed to forming a non-woven mat of polyolefin fiber having a thickness in the range 10-40 mils and pore sizes less than 40 microns, contacting the mat with an aqueous solution of a water-soluble peroxy compound at a temperature below 70° C., rinsing the mat in water and thereafter immersing the thus treated mat in an aqueous solution of a hydrophilic vinyl monomer, said solution containing a redox catalyst thereby causing a graft polymerization of said hydrophilic vinyl monomer on said polyolefin mat to give a wettable polyolefin battery separator.

Battery separators produced from non-woven webs of polyolefins, specifically polypropylene, are well known in the art. Patents directed to their formation and wettability include but are not limited U.S. Pat. Nos. 3,002,040; 3,026,366; 3,045,058; 3,055,966; 3,084,091; 3,092,438; 3,216,864; 3,276,944; 3,314,821; 3,341,394; 3,351,495; 3,354,247; 3,615,995; 3,755,523 and 3,773,590. Thus although there is much prior art on the formation of non-woven webs from polyolefins, which polyolefins have a predominance of the best physical and chemical characteristics for the formation of a battery separator, there is still one problem which precludes or curtails such use. That is, the polyolefins employed as battery separators for the most part have a high degree of non-polarity. This non-polarity characteristic greatly hinders their operability since it diminishes and often time precludes the acid electrolyte from wetting its surface thereby hindering the flow of ions to their proper electrodes.

One object of the instant invention is to produce a battery separator formed from non-woven mats of polyolefin fibers which are readily wettable in acid electrolytes. Another object of the instant invention is to produce a process for making a battery separator formed from non-woven mats of polyolefin fibers wettable.

The above and other objects of the instant invention which will be apparent from a reading hereinafter are accomplished by forming a non-woven mat of polyolefin fiber having a thickness in the range 10-40 mils and pore sizes less than 40 microns, contacting the mat with an aqueous solution of a water soluble peroxy compound, e.g. hydrogen peroxide at a temperature below 70° C., rinsing the thus contacted mat in a water bath and thereafter immersing the thus rinsed mat in an aqueous solution of a hydrophilic vinyl monomer, e.g. acrylic acid, said solution containing a redox catalyst, e.g. an ion of a transition metal, e.g. ferrous ion, thereby causing a graft polymerization of said hydrophilic vinyl monomer on said polyolefin mat to form a wettable polyolefin battery separator. As used herein "vinyl monomer" means a monomer of the formula

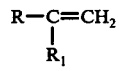

wherein either R or R$_1$ or both are hydrophilic radicals.

One advantage of the instant invention is that the process is completely carried out in aqueous solutions and thus no organic solvents with their problems of recovery, toxicity and pollution are involved.

As aforestated, battery separators formed from a non-woven mat of polyolefin fiber can be made in various ways. One method of accomplishing this is set out in U.S. Pat. No. 3,773,590. That is, polypropylene, preferably in pellet or crumb form, is added to a hopper and fed to an extruder wherein it is heated at temperatures in the range 620°-800° F. After thermal treatment, the polypropylene is forced through the extruder by a drive motor into the die head, which head may contain a heating plate. The polypropylene is then forced out a row of die openings in the die head into a gas stream which attenuates the polypropylene into fibers. The gas stream which attenuates the polypropylene is supplied through gas jets, said gas being a hot gas, preferably air. The flow of the gas is controlled to between 0.7 and 4 pounds per minute, thus producing polypropylene fibers having an average diameter between 1 to about 10 microns. The thus formed fibers are collected as a self-supporting mat on a collecting device such as a rotating drum. The mat produced by the melt blowing process has a basis weight of between 60 and 500 grams per square meter and a thickness which may vary between 20 and 200 mils. To produce a battery separator from the non-woven mat produced by the melt blowing process, the mat must be compacted to obtain the desired thickness and porosity as well as the mechanical properties of strength and abrasion resistance. The non-woven mat is compacted to a thickness of between about 10 and 40 mils, preferably by means of a thermal compacting operation using calender rolls or a press to obtain the non-woven mat of fixed thickness. The non-woven mat can then be ribbed, if desired, by conventional means such as by extrusion or embossing. Ribs extruded onto the mat can be of either the same material as the mat or other thermal plastic polymers and said ribs can be either solid or of foam structure as shown in U.S. Pat. No. 3,773,590.

On a continuous basis, a roll of polyolefin mat is then passed into an aqueous solution of a water soluble peroxy compound, e.g. hydrogen peroxide or potassium persulfate at a temperature below 70° C. for a period of time sufficient to allow the formation of hydroperoxide groups on the polyolefin chain. The continuous roll is then passed into a water bath where it is rinsed to remove unreacted peroxy compound. The roll is then immersed in a bath of an aqueous solution of hydrophilic vinyl monomer, e.g. acrylic acid, which solution contains a redox catalyst, e.g. ferrous ion. This bath is maintained at a temperature below 70° C. to curtail or preclude thermal homopolymerization of the vinyl monomer. Furthermore, in practicing this invention it is critical that the steps for the formation of the hydroperoxide groups on the polyolefin chain and the graft polymerization step be carried out at temperatures below 70° C. This is necessitated by the fact that polypropylene undergoes a phase change at about 90° C. In order to maintain dimensional stability of the polypropylene mat, the steps necessary to cause wettability are carried out at temperatures below that at which dimensional stability is affected. Graft copolymers are prepared by contacting the hydroperoxide polyolefin with the hydrophilic vinyl monomer under such conditions that the hydroperoxide groups on the polymer are decomposed to provide a free radical source for the initiation of graft polymerization of the vinyl monomer at the site of the hydroperoxy group on the polymer chain. The graft polymerization step is usually carried out at a temperature ranging from about 20° to about 70° C. in the presence of a redox reducing agent.

The graft polymerization is preferably, but not necessarily, carried out in an inert atmosphere, e.g. under a nitrogen blanket. The graft polymerization step is operable under atmospheric conditions but increased grafting rates and improved uniformity are obtained with an inert atmosphere. The mat is then removed from the bath, water washed to remove unreacted vinyl monomer solution and rolled up on a take-up roll ready for use.

In the grafting step whereby the polyolefin web is soaked, immersed, dipped, sprayed or otherwise coated with the hydrophilic vinyl monomer in aqueous solution, a commercially available surfactant can be added to the aqueous solution, if desired, to decrease surface tension. However such addition is unnecessary and the invention is operable without same.

Various polyolefins are operable herein as battery separators and include but are not limited to polypropylene, polyethylene, ethylene-butene copolymers, ethylene-propylene copolymers, ethylene-propylene terpolymers, e.g. ethylene-propylene and a minor amount of a nonconjugated diene such as a cyclic or aliphatic diene, e.g. hexadiene, dicyclopentadiene, ethylidene norbornene; synthetic rubbers and the like.

The thus formed polyolefin web of the instant invention prior to grafting with the hydrophilic vinyl monomer has pore sizes less than 40 microns in the web, which size is eminently suitable for use as a battery separator.

The non-woven mat of polyolefin fiber is maintained in the aqueous solution of the water soluble peroxy compound for periods ranging from about 1 second to about 30 minutes. The peroxy compound is present in the bath at a concentration range from 0.01 to 40.0% by weight. The higher the concentration, the shorter the period of time necessary to allow the formation of hydroperoxide groups on the polyolefin chain, but the longer the time required to remove all of the peroxy compound from the system.

In the grafting step, the graft polymerization is carried out in a period ranging from about 10 seconds to about 2 hours. The hydrophilic vinyl monomer is present in the aqueous solution in amounts ranging from 1–75 weight percent.

The process of the instant invention is operable either as a batch or continuous process.

Various redox catalysts are operable herein. Preferred redox catalysts are salts or complexes of metals in a reduced oxidation state but capaple of existing in more than one valence state. Operable redox reducing agents include, but are not limited to, ferrous sulfate, vanadyl sulfate, ferrous sulfide, ferrous or ferric acetylacetone, ferrocyanide, ferrous o-phenanthroline and corresponding compounds of cobalt, nickel, copper, chromium, maganese, titanium and cerium. Other redox catalysts operable herein include organic amines, e.g. monoamines, polyamines such as diethylenetriamine, triethylenetetraamine and tetraethylenepentamine, potassium persulfate, sodium hyposulfite and the like.

Any hydrophilic vinyl monomer which can be polymerized by a free radical mechanism can be grafted onto the hydroperoxidized polymer chain herein. Examples of hydrophilic vinyl monomers of the formula

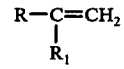

wherein either R or $R_1$ or both are hydrophilic radicals which can be grafted include, but are not limited to, unsaturated acids such as acrylic or methacrylic acid, vinyl ethers, vinyl pyridine, and other vinyl compounds, allyl compounds such as allyl alcohol, allyl amine, etc., ethylene maleate, maleic anhydride, acrylamide, methacrylamide, diethylaminoacrylamide, diethylaminoethyl acrylate, vinyl pyrrolidone, 2- and 4-vinyl pyridines, and the like, or mixtures of two or more of these monomers.

For purposes of explanation this invention will be set out example-wise using polypropylene as the polyolefin web. However, as aforestated, various other polyolefins are operable herein.

For measuring wettability after the graft polymerization step, the following procedure was used.

The battery separators comprising a non-woven mat of polyolefin fiber with the hydrophilic vinyl monomer graft polymerized thereto were placed in an empty 12 volt battery case separating each battery separator with a corrugated PVC liner. Each cell was filled with 1.250 specific gravity sulfuric acid charged at a temperature of 70° F. The battery case was covered with polyethylene and placed in a 150° F. constant temperature bath for 2½ hours. The battery case was removed from the bath, the acid discharged and the separators were each washed with water at a temperature of 75° ± 5° F. for 1½ hours at a rate of 2 gallons of water per minute. Thereafter the washed separators were dried in a forced air oven at 230° ± 10° F. for 30 minutes. The dried separators were then allowed to approach equilibrium moisture by standing at room temperature (24° C.) for at least ½ hour prior to testing in acid. The acid test for wettability was carried out in a 1.250 specific gravity sulfuric acid bath at a temperature between 75°–85° F. Wettability was determined as the precentage of the surface area of the battery separator which turned translucent within a certain time period.

The following examples will explain but expressly not limit the instant invention. Unless otherwise noted, all parts and percentages are by weight.

EXAMPLE I

Non-woven polypropylene mats were produced by the melt-blowing process set out herein and in U.S. Pat. No. 3,773,590 under the following conditions:

| Polypropylene resin | 33.6 melt flow rate |
|---|---|
| Die Temp. ° F | 580 |
| Air Temp. ° F | 644 |
| Polymer Rate gm/min | 7.9 |
| Air rate lbs./min. | 1.27 |
| Collector distance: | |
| in. | 6.0 |
| RPM | 1.0 |

The resultant polypropylene fibers in the mats had a diameter of 2 microns or less. The basis weight of mats varied from 256–270 gr./meter². The thus formed mats were compacted on a heated calender to a thickness of 21 mils.

EXAMPLE II

Polypropylene mats from Example I (5½ inch × 5½ inch) were soaked in an aqueous solution containing 30% hydrogen peroxide. After 15 minutes the mats were removed. The thus treated mats were then washed in distilled water for 1½ hours. The washed mats were then immersed for 15 minutes in an aqueous solution containing 10% by weight acrylic acid, 0.4 weight percent of a surfactant, i.e. an ester of a sulfonated dicarboxylic acid commercially available from American Cyanamid Company under the tradename "Aerosol OT" and 0.01 weight percent $FeSO_4$. The mats were rinsed and dried. The dried mat was 90% wettable in 90 seconds in 1.250 specific gravity sulfuric acid after testing as described previously. The mat had an electrical resistance of 0.6 milliohms/mil.

A polypropylene mat from Example I, not subjected to the peroxidation and grafting step as set out supra in Example II had negligible wettability and when tested had almost an infinite electrical resistance.

EXAMPLE III

Example II was repeated using an aqueous solution containing 10% by weight methacrylic acid, 0.4 weight percent of "Aerosol OT" and 0.01 weight percent $FeSO_4$. The dried mat was completely wettable instantly in water.

EXAMPLE IV

Example II was repeated except that the vinyl monomer was N,N-diethylaminoethyl acrylate. The battery separator showed wettability after about 15 minutes.

EXAMPLE V

Example II was repeated except that the vinyl monomer was a 10% aqueous solution of 2-aminomethyl methacrylate. Wettability was exhibited.

What is claimed is:

1. The process of forming a wettable battery separator from a polyolefin which comprises extruding a heated polyolefin through multiple die openings into a gas stream which attenuates the polyolefin into fibers having an average diameter between 1 to about 10 microns, collecting said fibers as a self-supporting mat on a collecting device, compacting the thus formed mat to a thickness between 10 and 40 mils and pore sizes less than 40 microns, contacting the mat with an aqueous solution of a water-soluble, peroxy compound at a temperature below 70° C. without the introduction of oxygen, rinsing the thus contacted mat in a water bath and thereafter at a temperature below 70° C. immersing the thus rinsed mat in an aqueous solution of a hydrophilic vinyl monomer of the formula

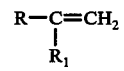

wherein at least one of R and $R_1$ are hydrophilic radicals, said solution containing a redox catalyst, thereby causing a graft polymerization of said hydrophilic vinyl monomer onto said polyolefin mat to form a wettable polyolefin battery separator.

2. The process according to claim 1 wherein the hydrophilic vinyl monomer is acrylic acid.

3. The process according to claim 1 wherein the redox catalyst is $FeSO_4$.

4. The process according to claim 1 wherein the water-soluble peroxy compound is hydrogen peroxide.

* * * * *